United States Patent
Kister (10) Patent No.: US 10,843,534 B2
(45) Date of Patent: Nov. 24, 2020

(54) REMOTELY OPERATED SUN VISOR

(71) Applicant: Talfred Tim Kister, Apache Junction, AZ (US)

(72) Inventor: Talfred Tim Kister, Apache Junction, AZ (US)

( * ) Notice: Subject to any disclaimer, the term of this patent is extended or adjusted under 35 U.S.C. 154(b) by 0 days.

(21) Appl. No.: 16/696,496

(22) Filed: Nov. 26, 2019

(65) Prior Publication Data

US 2020/0164724 A1   May 28, 2020

Related U.S. Application Data

(60) Provisional application No. 62/771,887, filed on Nov. 27, 2018.

(51) Int. Cl.
*B60J 3/02* (2006.01)

(52) U.S. Cl.
CPC .................. *B60J 3/0217* (2013.01)

(58) Field of Classification Search
CPC ..................................... B60J 3/0217
USPC ................ 296/97.4, 97.12, 97.9, 97.13
See application file for complete search history.

(56) References Cited

U.S. PATENT DOCUMENTS

| 4,987,315 | A | * | 1/1991 | Abu-Shumays | ....... B60J 3/0208 296/97.11 |
| 5,350,212 | A | * | 9/1994 | Corn | ..................... B60J 3/0208 296/97.11 |
| 2001/0005088 | A1 | * | 6/2001 | Hennessey | ............. B60J 3/0217 296/97.1 |

* cited by examiner

*Primary Examiner* — Joseph D. Pape (57) ABSTRACT

A remotely operated sun visor includes a first rotational mechanism, a second rotational mechanism, a sun visor body, a controller unit, and a power switch. The first rotational mechanism and the second rotational mechanism are perpendicularly positioned of each other in such a way that the first rotational mechanism is internally positioned along the sun visor body and the second rotational mechanism is internally positioned across the sun visor body. The sun visor body being torsionally connected to the first rotational mechanism so that the sun visor body can be rotated up and down, about an automobile windshield. The sun visor is torsionally connected to the second rotational mechanism so that the sun visor body can be rotated from the windshield to the side windows, about an automobile A-pillar. The first rotational mechanism and the second rotational mechanism are electrically connected to the power switch through the controller unit.

10 Claims, 9 Drawing Sheets

REMOTELY OPERATED SUN VISOR

The current application claims a priority to the U.S. Provisional Patent application Ser. No. 62/771,887 filed on Nov. 27, 2018.

FIELD OF THE INVENTION

The present invention relates generally to a sun visor. More specifically, the present invention is a remotely operated sun visor which can be controlled remotely by the driver as sun visor does not need to manually manipulate. The present invention is specifically designed for automobiles; however, the present invention is not limited to this option, and it may further be adapted to fit a variety of applications.

BACKGROUND OF THE INVENTION

Driving in the sun may be an enjoyable experience, but it can also lead to a hazard if the driver's view is compromised by a glaring sun. This glare can make it much more difficult to see the road ahead and potential hazards, leading to an increased likelihood of accidents. Sun visor is an effective apparatus to protect the driver or front passenger from sun rays, such that the sun does not shine directly into the occupants' eyes. Almost every automobile is equipped with at least two sun visors that are positioned adjacent to a top portion of the windshield, one at the driver's side and another at the front passenger's side. Under certain lighting conditions, the driver may deploy the sun visor by rotating the sun visor about a rotational axis from a non-deployed position to a deployed position to prevent part of light transmission from entering the cabin, thereby enabling the driver to focus on vehicle operations. However, the occupants have to manually move the sun visors up and down or from the front windshield to the side windows. This course of actions inevitably distracts the driver's attention and adversely influence the driving safety, especially when driving at a high speed. Meanwhile, the occupant is only allowed to easily manipulate the sun visor in front of him. For example, it is almost impossible for the driver who is driving to move the passenger side sun visor. Moreover, it is difficult for a tall driver to manually manipulate the sun visor due to cramped space in the cabin. It is an objective of the present invention to provide a remotely operated sun visor that can easily solve some of these problems. Since the present invention is remotely powered or actuated, driver is able to eliminate any kind of distractions that can generally occur with the manually operated sun visors. Furthermore, the present invention provides a seamless remote operation as the driver is able to easily access the operational power switch of the present invention thus individually rotating the visors body of the present invention up and down or from the front windshield to the side windows.

SUMMARY OF THE INVENTION

The present invention is a remotely operated sun visor which can be controlled remotely to move up and down or from the windshield to the side windows. Therefore, the need for manual intervention is eliminated and driving safety is improved. The present invention can be mounted to the automobile as a substitute for existing sun visors or it can be retrofitted onto the existing sun visors. The present invention can be powered through the automobile battery or a separate power source.

DETAIL DESCRIPTIONS OF THE INVENTION

All illustrations of the drawings are for the purpose of describing selected versions of the present invention and are not intended to limit the scope of the present invention.

The present invention a remotely operated sun visor that can be deployed or actuated electrically and remotely, so as to substantially eliminate the manual intervention at the initiation and termination of each use. The present invention can be mounted or pre-manufactured to an automobile as a substitute for existing visors or retrofitted onto the existing sun visors, without having to remove them. In reference to FIG. 1-2 and FIG. 9, the present invention comprises a first rotational mechanism 1, a second rotational mechanism 9, a sun visor body 16, a controller unit 20, and a power switch 21.

Figure 9:
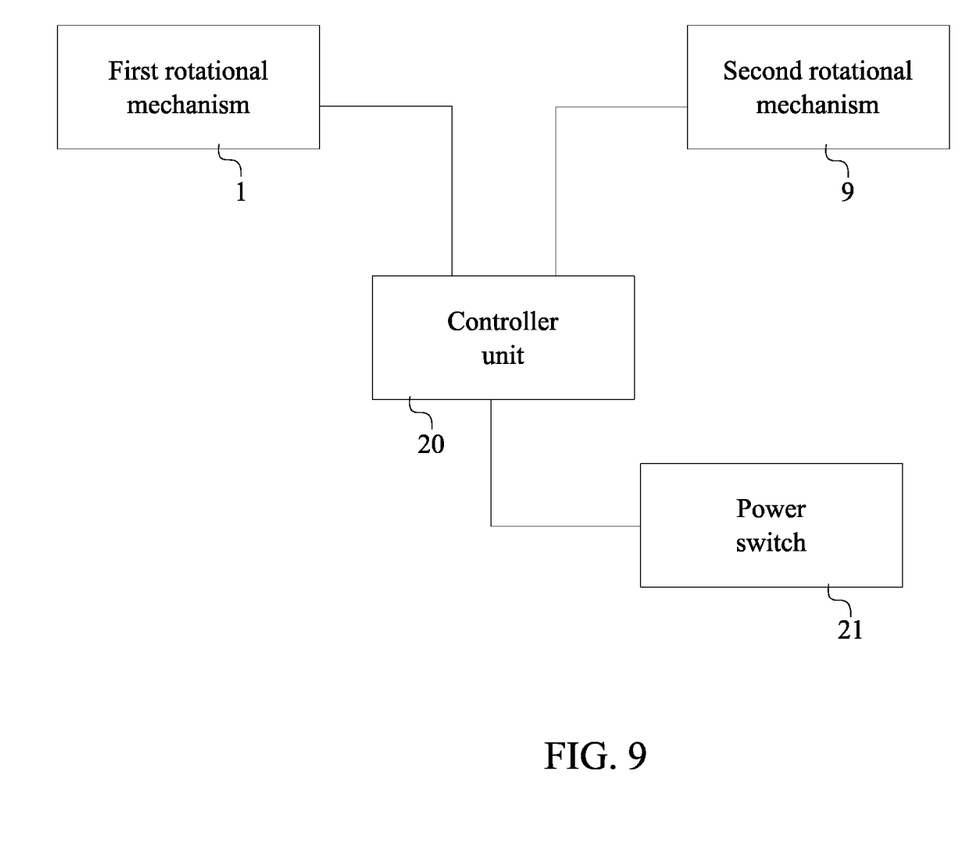
FIG. 9 is a basic illustration showing the electronic connections of the present invention.

In reference to the general configuration of the present invention, the first rotational mechanism 1 and the second rotational mechanism 9 are perpendicularly positioned of each other so that the present invention can be rotated about two different axis. In reference to FIG. 2, the first rotational mechanism 1 is internally positioned along the sun visor body 16 thus enabling the sun visor body 16 to be torsionally connected. As a result, the sun visor body 16 is able to rotate about a top edge of an automobile windshield via the first rotational mechanism 1. For example, when the first rotational mechanism 1 is operational, the sun visor body 16 can be rotated up and down with respect to the automobile windshield and the automobile roof. The second rotational mechanism 9 is internally positioned across the sun visor body 16 so that the sun visor body 16 can be torsionally connected to the second rotational mechanism 9. As a result, the sun visor body 16 is able to rotate about an automobile A-pillar. For example, when the second rotational mechanism 9 is operational, the sun visor body 16 can be rotated side to side with respect to the automobile windshield and the automobile side window. In order to accomplish the remote operation of the present invention, the first rotational mechanism 1 and the second rotational mechanism 9 are electronically connected to the power switch 21 through the controller unit 20 as shown in FIG. 9. As a result, the driver is able to actuate the sun visor body 16 through the power switch 21 as the controller unit 20 process and implements the driver inputs into the first rotational mechanism 1 and the second rotational mechanism 9.

Figure 3:
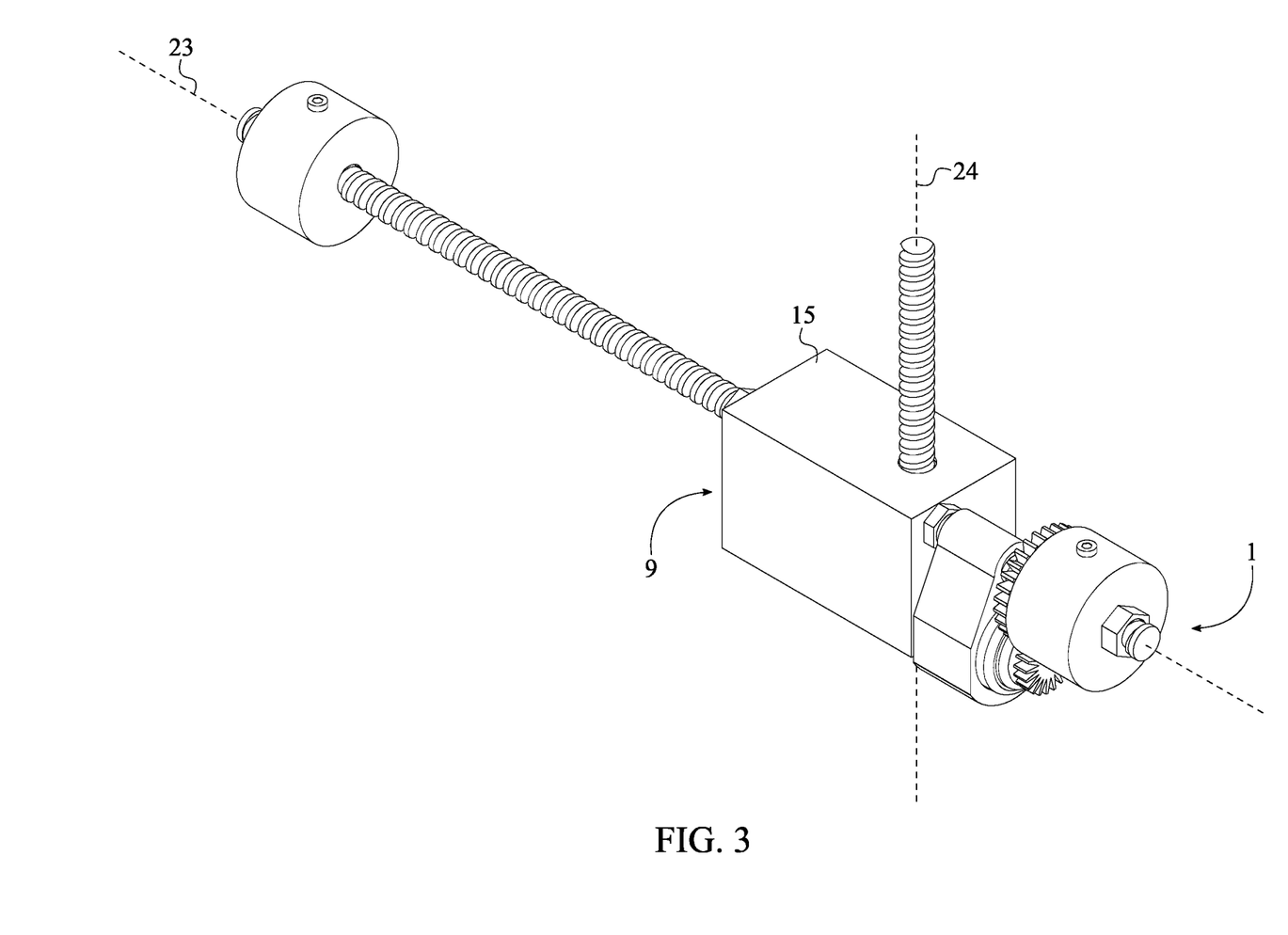
FIG. 3 is a perspective view of the first rotational mechanism and the second rotational mechanism being connected to the enclosure.
Figure 4:
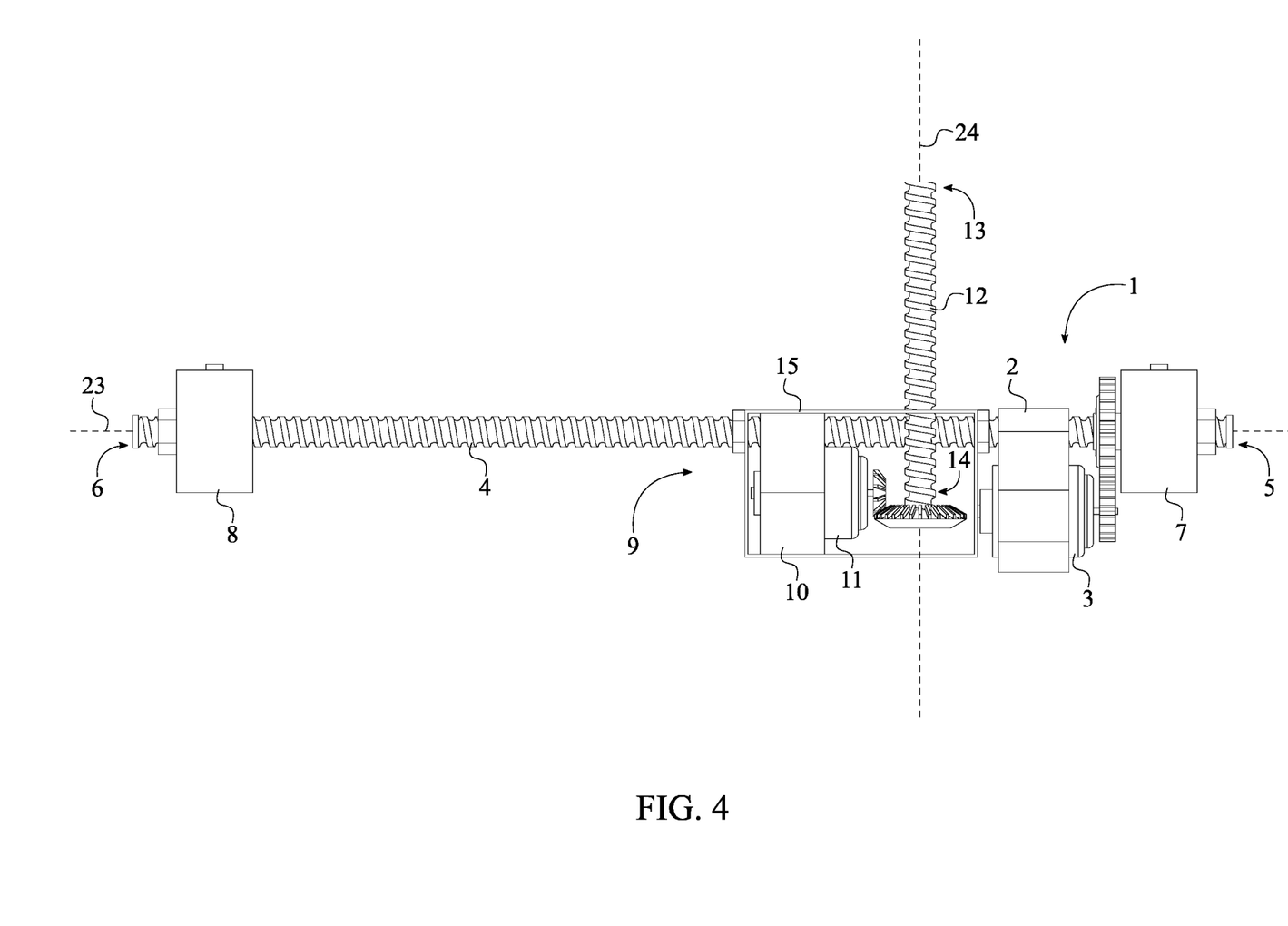
FIG. 4 is a side view of the of the first rotational mechanism and the second rotational mechanism, wherein the enclosure is opened to illustrate the internal components.

The first rotational mechanism 1 is generally oriented along the top edge of the automobile windshield so that the sun visor body 16 can actuate up and down thus blocking sunlight that may come through the automobile windshield. In reference to FIG. 3-4, the first rotational mechanism 1 comprises a first support 2, a first motor 3, a first rod 4, an outer mount 7, and an inner mount 8. In order to rotate the sun visor body 16 up and down, the outer mount 7 is threadedly engaged with the first rod 4 and the inner mount 8 is threadedly engaged with the first rod 4. In order to properly secure and balance the sun visor body 16, the outer mount 7 and the inner mount 8 are oppositely positioned of each other about the first rod 4. More specifically, the first rod 4, the outer mount 7, and the inner mount 8 are concentrically aligned along a first rotational axis 23 of the preset invention. The outer mount 7 is threadedly engaged with an outer end 5 of the first rod 4. The inner mount 8 is threadedly engaged with an inner end 6 of the first rod 4.

Furthermore, the sun visor body 16 is terminally attached to the outer mount 7 and the inner mount 8 as the inner mount 8 and the outer mount 7 also provide the necessary surface area to terminally secure the sun visor body 16. More specifically, a top panel 17 of the sun visor body 16 is attached to the outer mount 7 and the inner mount 8 by a plurality of fasteners 22 as shown in FIG. 2.

Figure 5:
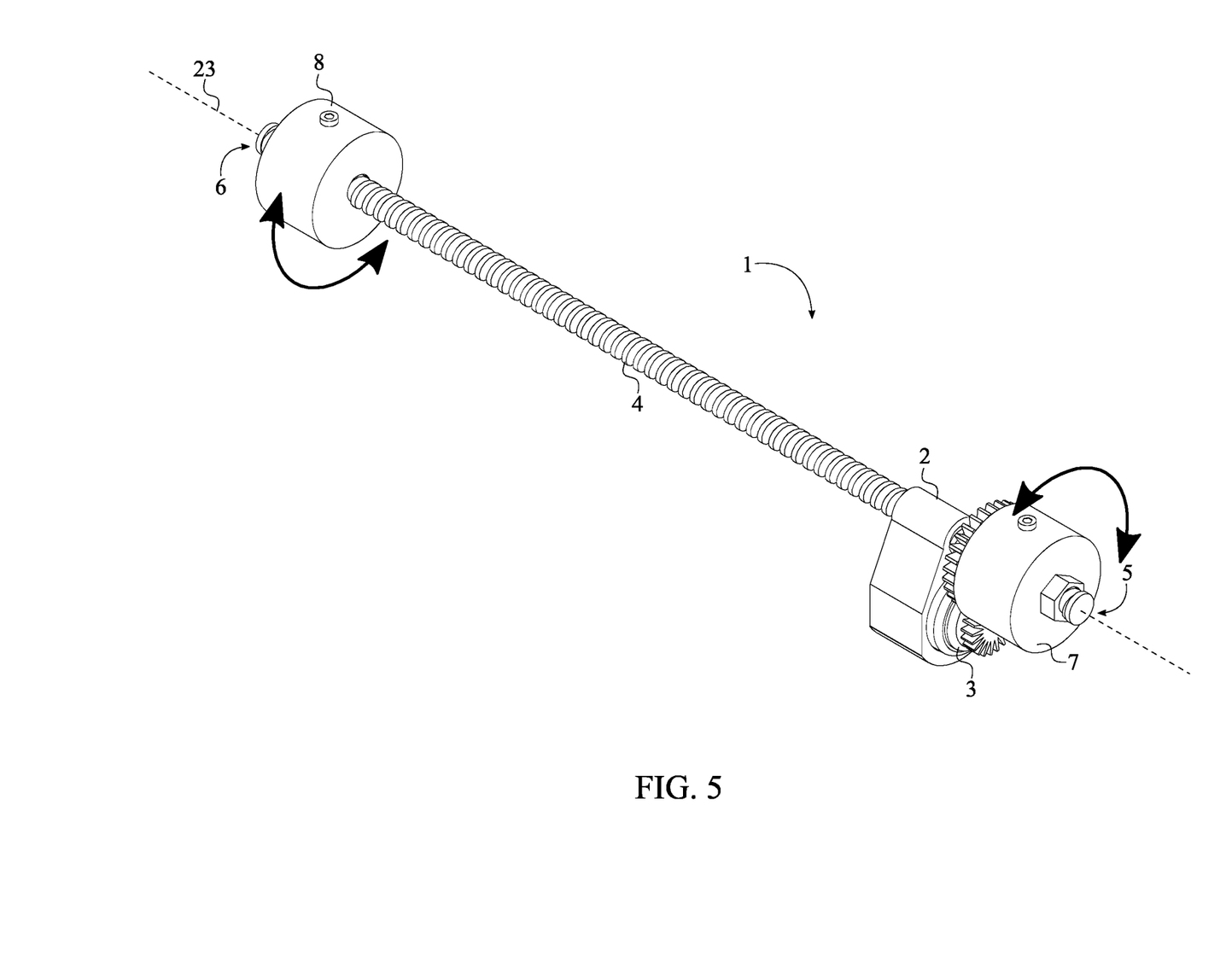
FIG. 5 is a perspective view of the first rotational mechanism showing the up and down rotational directions.

In reference to FIG. 5, the first motor 3 is mounted to the first rod 4 by the first support 2 in such a way that the first motor 3 is positioned stationary about the first rod 4. In order to apply rotational force to the sun visor body 16, the outer mount 7 is torsionally engaged with the first motor 3. As a result, when the first motor 3 is powered, the outer mount 7 can be rotated about the first rotational axis 23. Due to the concentric alignment of the first rod 4, the inner mount 8, and the outer mount 7, the rotational force of the first motor 3 can be simultaneously applied to the inner mount 8 along the first rotational axis 23.

Figure 6:
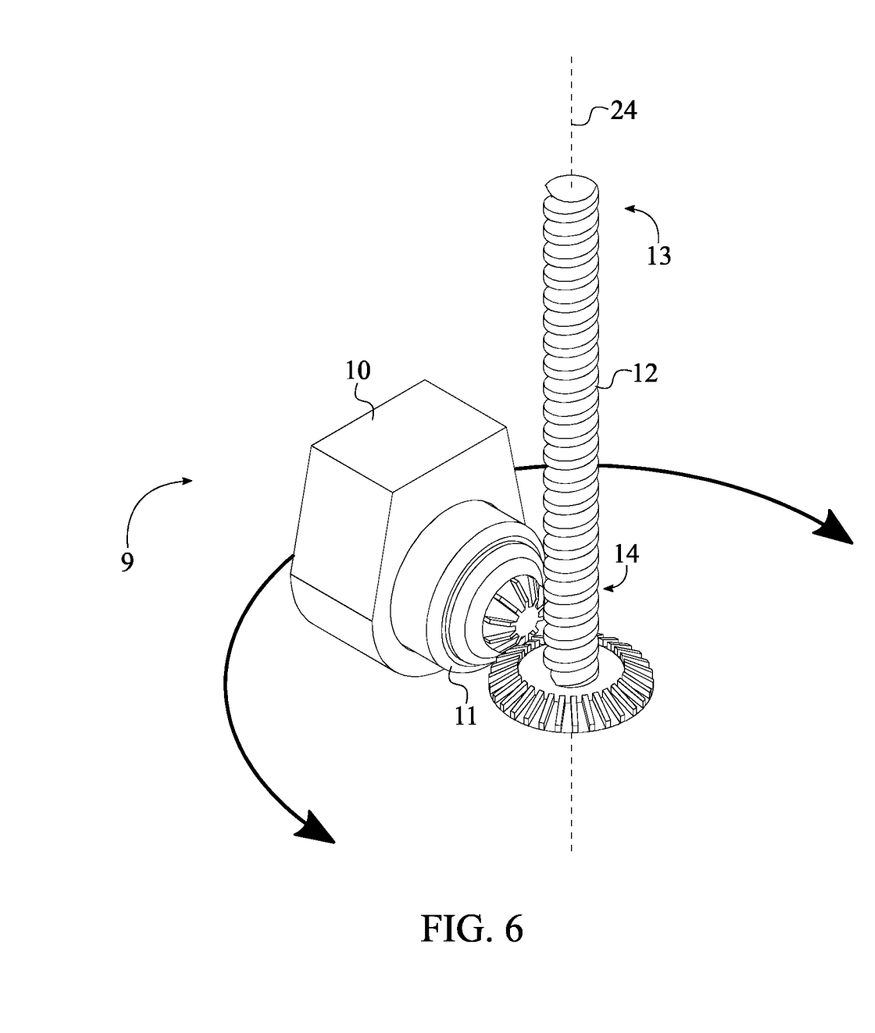
FIG. 6 is a perspective view of the second rotational mechanism showing the side to side rotational directions.

The present invention further comprises an enclosure 15 that enables the first rotation mechanism and the second rotational mechanism 9 to be secured within the sun visor body 16. In reference to FIG. 3-4 and FIG. 6, the second rotational mechanism 9 comprises a second support 10, a second motor 11, and a second rod 12. The second rotational mechanism 9 is generally oriented downward from the automobile A-pillar so that the sun visor body 16 can actuate side to side thus blocking sunlight that may come through the automobile windshield or the automobile side window. In order to rotate the sun visor body 16 side to side, the second motor 11 is internally mounted to the enclosure 15 by the second support 10 and is torsionally engaged with the second rod 12. As a result, when the second motor 11 is powered, the sun visor body 16 and the enclosure 15 are rotated around the second rod 12 as the sun visor body 16 being externally connected to the enclosure 15. More specifically, the second rod 12 is concentrically aligned along a second rotational axis 24 of the preset invention. A top end 13 of the second rod 12 is positioned external to the sun visor body 16. The top end 13 provides the necessary surface area to secure the present invention to the automobile as a substitute for existing visors or as an accessory for existing sun visors. A bottom end 14 of the second rod 12 is positioned within the enclosure 15 as the second motor 11 is torsionally engaged with the bottom end 14. Resultantly, the enclosure 15 is able to rotate around the second rotational axis 24 via the second motor 11. In other words, when the second motor 11 is powered, the second motor 11 is able to rotate around the second rod 12 due to the fixed connection of the second rod 12 to the automobile and the torsional connection between the second rod 12 and the second motor 11.

Figure 1:
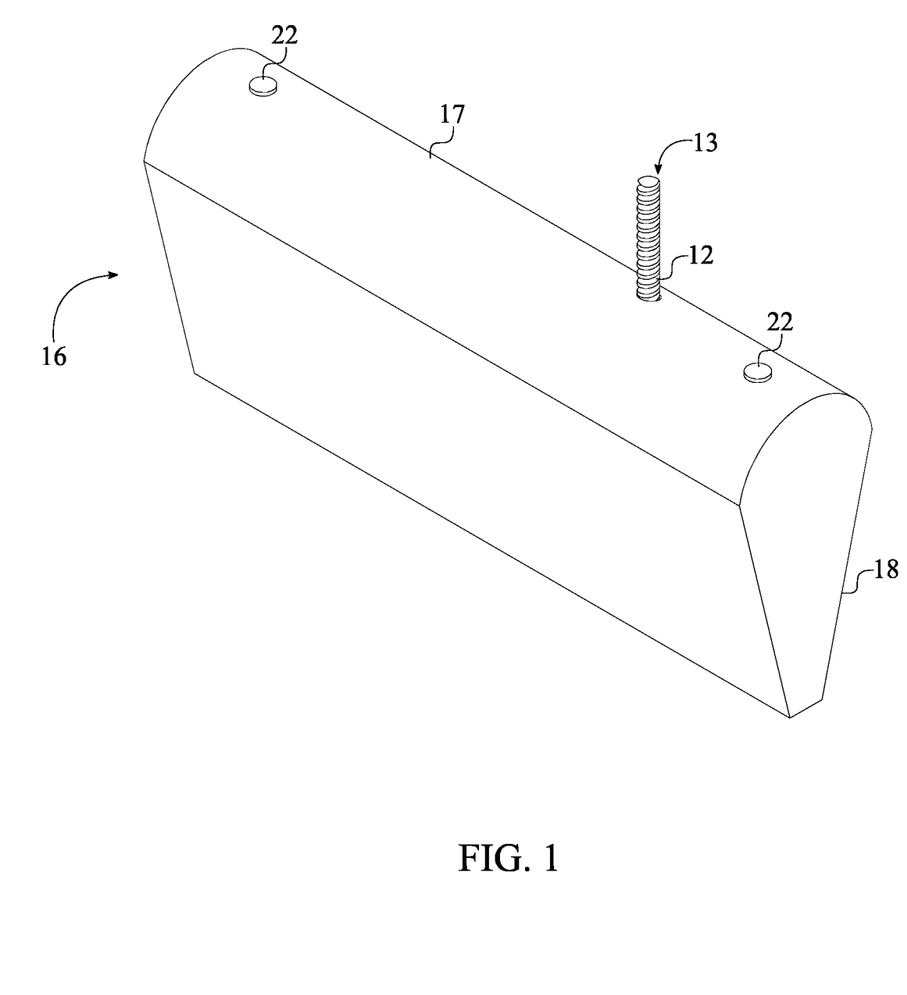
FIG. 1 is a top perspective view of the present invention.
Figure 2:
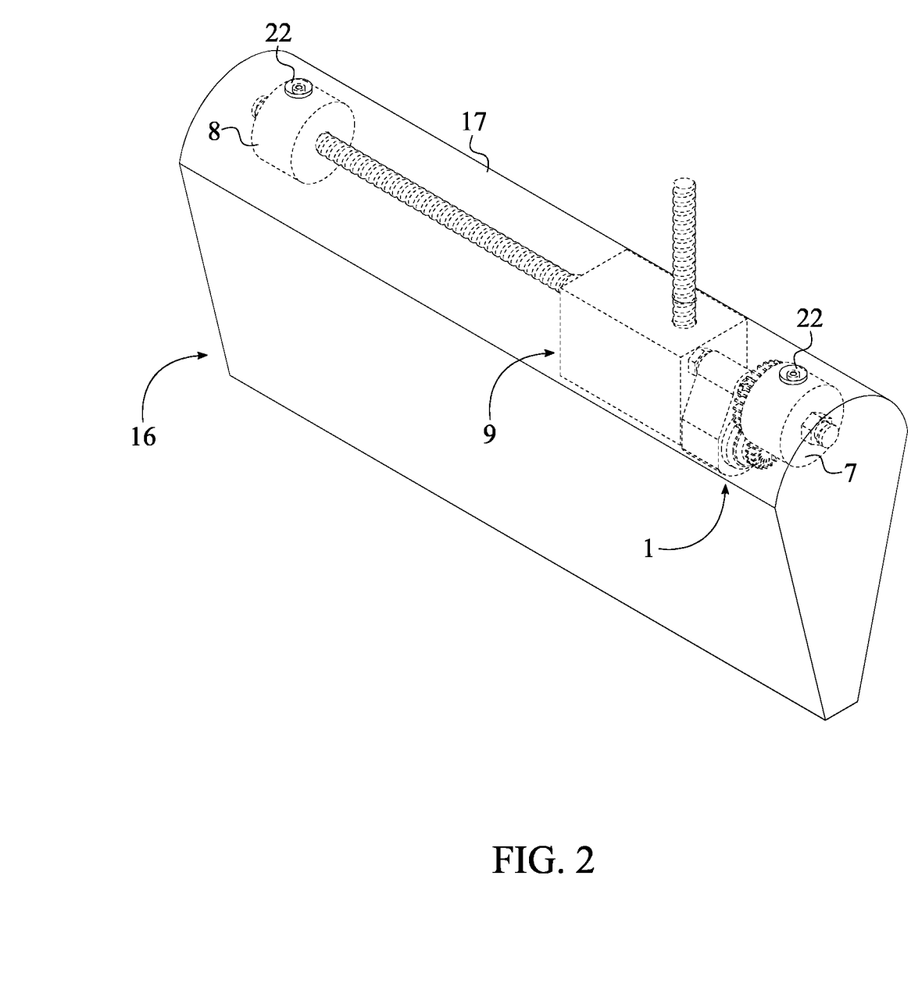
FIG. 2 is a top perspective view of the present invention, wherein the internal components of the sun visor body is shown with dash lines.

In reference to FIG. 1-2, the first rod 4 and the second rod 12 are perpendicularly positioned of each other so that the present invention is able to rotate around the first rotational axis 23 and the second rotational axis 24. More specifically, the first rod 4 is extended along a front panel 18 of the sun visor body 16 and connected to the enclosure 15 so that the sun visor body 16 can be rotated up and down about the first rotational axis 23. The enclosure 15 is positioned in between the outer mount 7 and the inner mount 8 to further balance the sun visor body 16 with respect to the second rod 12 which secures the present invention to the automobile. The second rod 12 is extended across the front panel 18 as the top end 13 traverses out of the top panel 17. Since the second rod 12 only traverses through the enclosure 15 and connected only to the automobile, the enclosure 15 is rotatably positioned around the second rod 12 thus enabling the side to side rotation about the second rotational axis 24.

The controller unit 20 processes driver's inputs that are received through the power switch 21 and outputs timing and control signals to the first rotational mechanism 1 and/or the second rotational mechanism 9. The power switch 21 is an electronic unit that allows the driver to remotely operate the first rotational mechanism 1 and the second rotational mechanism 9. In some embodiment of the present invention, the power switch 21 can be a separate unit mounts to the control panel or dashboard of the automobile. In some embodiment of the present invention, existing controls within the automobile can be utilized as the power switch 21. Preferably, the power switch 21 is designed similar to power mirror switch so that the user can easily control the first rotational mechanism 1 and the second rotational mechanism 9 through a single switch apparatus. Furthermore, the controller unit 20 and the power switch 21 are electrically connected to the separate power source or the battery of the automobile thus providing the electrical power to the both the controller unit 20 and the power switch 21.

Figure 7:
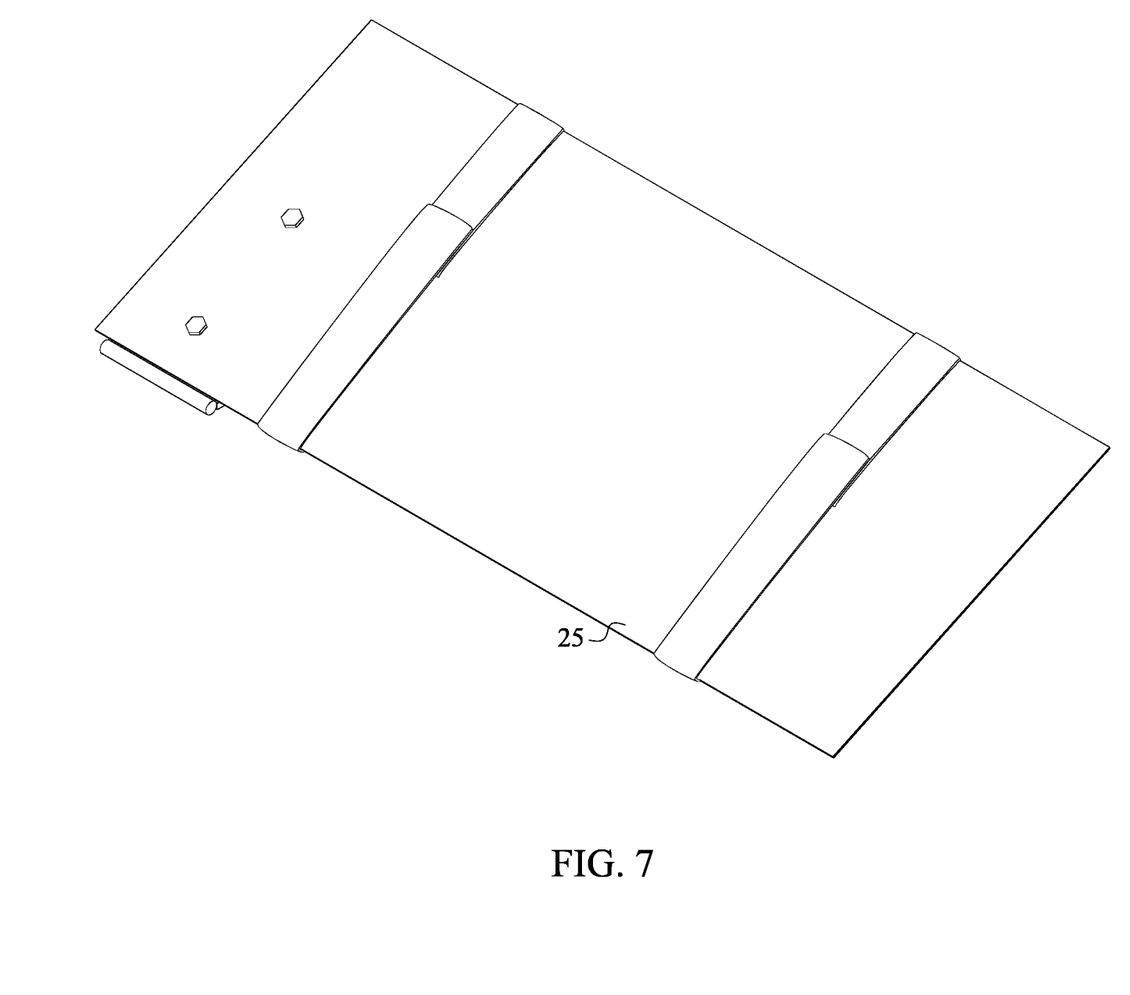
FIG. 7 is a top view of the mounting bracket of the present invention.
Figure 8:
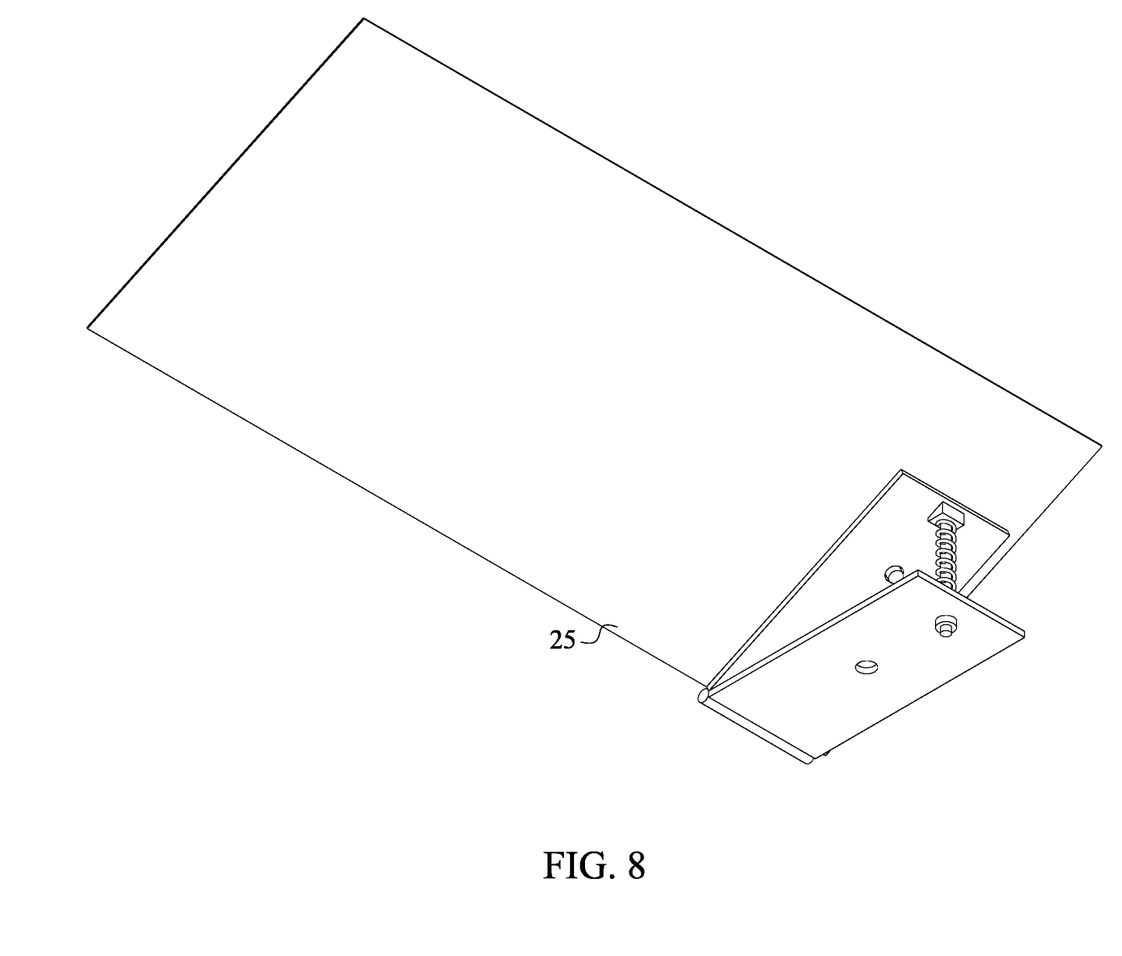
FIG. 8 is a bottom view of the mounting bracket of the present invention.

When the present invention functions as a substitute for existing visors, the top end 13 is terminally mounted to the automobile roof through a bracket. When the present invention functions as a retrofitted unit for the existing visors, the present invention utilizes a mounting bracket 25 as shown in FIG. 7-8. The top end 13 is terminally connected to the mounting bracket 25 that is removably mounted to an existing automobile sun visor through a pair of attachment straps.

Although the invention has been explained in relation to its preferred embodiment, it is to be understood that many other possible modifications and variations can be made without departing from the spirit and scope of the invention as hereinafter claimed.

What is claimed is:
1. A remotely operated sun visor comprising:
a first rotational mechanism;
a second rotational mechanism;
a sun visor body;
a controller unit;
a power switch;
the first rotational mechanism and the second rotational mechanism being perpendicularly positioned of each other;
the first rotational mechanism being internally positioned along the sun visor body;

the sun visor body being torsionally connected to the first rotational mechanism, wherein the sun visor body is rotated about an automobile windshield;

the second rotational mechanism being internally positioned across the sun visor body;

the sun visor body being torsionally connected to the second rotational mechanism, wherein the sun visor body is rotated about an automobile A-pillar; and the first rotational mechanism and the second rotational mechanism being electronically connected to the power switch through the controller unit.

2. The remotely operated sun visor as claimed in claim 1 comprising:

the first rotational mechanism comprising a first support, a first motor, a first rod, an outer mount, and an inner mount;

the outer mount being threadedly engaged with the first rod;

the inner mount being threadedly engaged with the first rod;

the outer mount and the inner mount being oppositely positioned of each other about the first rod;

the first motor being mounted to the first rod by the first support;

the outer mount being torsionally engaged with the first motor; and the sun visor body being terminally attached to the outer mount and the inner mount.

3. The remotely operated sun visor as claimed in claim 2 comprising:

a first rotational axis;

the first rod comprising an outer end and an inner end;

the first rod, the outer mount, and the inner mount being concentrically aligned along the first rotational axis;

the outer mount being threadedly engaged with the outer end; and the inner mount being threadedly engaged with the inner end.

4. The remotely operated sun visor as claimed in claim 2 comprising:

a plurality of fasteners; and a top panel of the sun visor body being attached to the outer mount and the inner mount by the plurality of fasteners.

5. The remotely operated sun visor as claimed in claim 1 comprising:

an enclosure;

the second rotational mechanism comprising a second support, a second motor, and a second rod;

the second motor being internally mounted to the enclosure by the second support;

the second motor being torsionally engaged with the second rod; and the sun visor body being externally connected to the enclosure.

6. The remotely operated sun visor as claimed in claim 5 comprising:

a second rotational axis;

the second rod comprising a top end and a bottom end;

the second rod being concentrically aligned along the second rotational axis;

the top end being positioned external to the sun visor body;

the bottom end being positioned within the enclosure; and the second motor being torsionally engaged with the bottom end.

7. The remotely operated sun visor as claimed in claim 1 comprising:

an enclosure;

the first rotational mechanism comprising a first rod, an outer mount, and an inner mount;

the second rotational mechanism comprising a second rod;

the first rod and the second rod being perpendicularly positioned of each other;

the first rod being extended along a front panel of the sun visor body;

the first rod being connected to the enclosure;

the enclosure being positioned in between the outer mount and the inner mount;

the second rod being extended across the front panel; and the enclosure being rotatably positioned around the second rod.

8. The remotely operated sun visor as claimed in claim 1 comprising:

a mounting bracket;

the second rotational mechanism comprising a second rod; and a top end of the second rod being terminally connected to the mounting bracket.

9. The remotely operated sun visor as claimed in claim 8, wherein the mounting bracket is removably mounted to an existing automobile sun visor.

10. The remotely operated sun visor as claimed in claim 8, wherein the mounting bracket is attached to an automobile roof.

* * * * *